United States Patent [19]
Milewski et al.

[11] 3,808,087
[45] Apr. 30, 1974

[54] SURFACE-TREATED LAMINATION STRUCTURES
[75] Inventors: John V. Milewski, Saddle Brook; James I. Shyne, Caldwell, both of N.J.
[73] Assignee: General Technologies Corporation, Springfield, Va.
[22] Filed: Aug. 21, 1970
[21] Appl. No.: 66,052

Related U.S. Application Data
[62] Division of Ser. No. 670,628, Sept. 26, 1967, Pat. No. 3,580,731.

[52] U.S. Cl............... 161/72, 117/106 R, 156/62.4, 156/148, 156/181, 161/60, 161/82, 161/141, 161/176
[51] Int. Cl............................................. C01b 31/30
[58] Field of Search............ 161/72, 87, 88, 95, 96, 161/151, 165; 117/106 R; 156/62.4, 148, 181

[56] References Cited
UNITED STATES PATENTS
3,147,085  9/1964  Gatti ........................... 117/106 R
2,428,654  10/1947  Collins ............................... 161/88

Primary Examiner—Harold Ansher
Assistant Examiner—James J. Bell
Attorney, Agent, or Firm—Alexander & Dowell

[57] ABSTRACT

The method of increasing the interlaminar shear strength capabilities of a material to be bonded to another material by growing integrally attached monocrystalline whiskers out from the surface of the first material both to roughen its surface for bonding to a deposited matrix material, or to a plastic, and to change its surface chemistry to improve bonding, for instance to a resin. The invention includes the reinforcing of fibrous structures by the intertwining of whiskers grown across voids therebetween, and further includes various whisker-grown structures per se.

9 Claims, 12 Drawing Figures

PATENTED APR 30 1974      3,808,087

SURFACE-TREATED LAMINATION STRUCTURES

This application is a division of copending application, Ser. No. 670,628, filed Sept. 26, 1967, now U.S. Pat. No. 3,580,731.

This invention relates to improvements in the structure of laminate members such as fibrils, yarns, bundles of fibers, mats, woven reinforcing fabrics, and rigid members having surfaces intended to be bonded to other materials, these improvements being for the purpose of increasing the strength of the bond by growing whiskers upon external surfaces so that they bond more securely to the various matrix filler materials to form high-strength composites. The invention also relates to novel processes for making the improved surface structures by growing monocrystalline whiskers normal to the surfaces.

The superior modulus of a polycrystalline fiber is contributed to by surface perfection which results in high surface tension, but at the same time, a very smooth surface. When these fibers are laminated the bond is the weakest feature of the combination, and tests show that such a composite readily fails by delamination, generally referred to as "surface interlaminar failure."

A salient example of the above problem is found in polycrystalline carbon fibers whose Young's Modulus is very high, around 25 to 50 million as compared with Fiberglass whose modulus is about 10 million, but the carbon surface bond capability with matrix materials is particularly poor. Carbon is not only a lighter material, weighing only about two-thirds as much as glass fiber, but is more inert chemically and has a high decomposition point of about 6,000° F. It is easily made by decomposing rayon thread or fabric in a reducing atmosphere, or it can be brought from several sources, for instance under the trade name Thornel from Union Carbide Company. However, information generated at the Naval Ordnance Laboratory, and published in several articles appearing in Nature Magazine in 1966 and 1967 showed in various composites an inverse correlation between interlaminar shear-strength and the Young's modulus of the carbon reinforcements, which relationship suggested a dim future for carbon-fiber composites unless a way were developed to vastly improve their bond to resins.

In various experimental programs, others have tried to improve the surface bond of carbon fibers variously by chemical surface treatment, etching, dip and bake, coating, roughening, etc., but these efforts resulted only in modest degrees of improvement, perhaps up to about 30 percent. The present invention has provided a solution of the problem by obtaining an improvement in the surface bond in the neighborhood of 500 percent or more, while providing a number of additional fringe benefits which will be set forth below.

It is the principal object of the invention to treat surfaces by "Whiskerizing" them to produce an improved capability of the surface to securely bond to another material, such as a matrix material.

It is another major object of the invention to prepare the surfaces of individual fibers for secure bonding without appreciably stiffening the fibers, as is the case when they were coated according to prior art efforts.

Another important object of the invention is to grow whiskers on the individual fibrils within a fiber bundle, thread, or woven cloth wherein the whiskers are integrally attached thereto and extend outwardly generally normal to the surfaces, thus providing reinforcements in three dimensions, and in such lengths that the whiskers grown from adjacent fibrils overlap and intertwine to provide enormous increases in interlaminar sheet strength. Typically, a bundle of carbon fibers forming a thread includes 720 or 1,440 individual fibrils, each of which is about 10 microns in diameter and is of polycrystalline structure. The whiskers grown on these fibrils are, however, only about .01 to 1 micron in diameter in the case of silicon carbide whiskers, and these whiskers comprise monocrystalline growths whose modulus is much higher because, being monocrystalline, they are free of grain boundaries, suface defects, dislocations, and impurities. They enjoy a strength which is obtainable only because of their high degree of perfection. As a result, when these whiskers are stressed, the pull is against atomic cohesion forces, rather than against the multiple imperfections which characterize polycrystalline structures. The former approach theoretical strength while the latter always fall short of it by many orders of mangitude.

Still a further object of this invention is to provide fiberous laminating structures wherein the whiskers have been grown between the individual fibrils and with such length and population density as to cross, intertwine, and occupy all of the interstitial voids located between fibrils, or between adjacent bundles of fibers, and/or between threads in a woven or matted material, whereby such whisker treated reinforcing products have a considerable degree of cohesion even before they are impregnated with matrix filler materials, i.e., resins.

Still a further object of this invention is to provide whisker treated filamentary products wherein whisker lengths are controlled to suit various different needs. For example, in a bundle of fibrils as set forth above, whiskers can be grown, say, to 10 bundle diameters making them useful for some types of matrix composite service, i.e., where interstitial voids are large. Alternatively, the whiskers can be grown to much shorter lengths where mere fibril surface roughening is desired but the whiskers are not needed as criss-crossing members in the resin occupied interstices. The presence of a dense growth of long whiskers is an advantage in high temperature applications, such as reinforcement of metal matrix rocket motor parts, because the pure monocrystalline nature of the whiskers makes them especially resistant to ablation. Nevertheless, there is such a thing as having the whisker growth in the interstices too dense, thus making it impossible to obtain complete penetration. The ratio of whisker length to diameter is important since it affects their tendency to interweave, tangle, bend or repel each other like little springs, i.e., packing factor. The whisker material itself is also important since it affects the general characteristics of the growth as well as the tendency of the whiskers to compatibly bond with the matrix material.

Yet a further object of the invention is to improve the surface bond capability of fibrils so that relatively short fibrils which have high Young's modulus can be successfully used and even spun into yarn for applications where formerly only long fibers or continuous filaments have been used.

Another major object of this invention is to provide techniques and processes for growing whiskers of controlled lengths and of selected materials upon fibrils, bundles, threads or weaves of various other similar or dissimilar materials using gas-transfer-mechanism techniques to grow whiskers of non-vaporizing materials in either batch or continuous runs.

The growing of whiskers is being done currently to obtain the whiskers themselves, the whiskers being grown as a crop upon slabs of sheet material and then broken off and collected for use as reinforcements in various matrix materials. These unattached whiskers have been used to strengthen high performance structures, such as turbine blades, and efforts are being made to spin the unattached whiskers into yarns. They are also being made into mats, papers, and wool-like forms. However, the immediate object of this invention is to grow the whiskers directly upon surfaces to which the whiskers remain integrally attached during impregnation within a suitable matrix material, or bonding of the "Whiskerized" surface to another material. A synergestic effect results, which provides a novel surface whose own material can differ from the whisker material, and in which none of these different materials, itself, has all of the properties desired but whose combination produces novel and especially adanvtageous mechanical configurations.

While it is a general object of this invention to improve the interlaminar shear properties of many different surface materials by growing whiskers directly upon them, it is a particular object of this invention to improve carbon fibers, fibrils, threads, mats, or woven cloth in this manner. When these treated fibers are combined with a suitable matrix material, such as a resin, a metal or a ceramic, the improved interlaminar bond is evidenced by the fact that the resulting composite behaves in a manner resembling more nearly an isotropic material.

The "Whiskerizing" process can produce (1) an improved surface chemistry which can be selected to be more compatible with the matrix material, (2) an improved surface geometry providing greater mechanical grip of the matrix material on the reinforcements, (3) an integral bond between whisker and supporting surface, and (4) a high degree of reinforcement of the interstitial plastic by whiskers which have been grown in the normally void regions adjacent to and between the fibers.

These improvements have been evaluated by testing unidirectional reinforced bar specimens by the horizontal short-beam shear method. Interlaminar shear strengths of at least 11,000 psi were measured on composites which were made of Royal Aircraft Establishment's (England) 54 million modulus graphite fibers and epoxy resin, which material without whisker growth exhibited a shear value of only about 2,500 psi. Shear strengths of at least 12,000 psi were achieved on composites made with Thornel 25 (modulus of 25 million psi) which showed shear values of only about 4,000 psi before whisker growth. The shear strengths are, in fact, greater than the strengths quoted because the specimens did not fail in shear but in bending. The failure was similar to that experienced by a homogeneous rather than an anisotropic material.

The process of growing whiskers upon these graphite fibers produced, in the early test runs, a substantial reduction in the tensile strength of the fibers after whisker treatment, some 30 percent or more. Moreover, there was a considerable weight loss of the fibers which accompanied the loss in strength and appeared related to it. It is therefore an object of this invention to provide an improved "Whiskerizing" process in which such weight-loss and loss in tensile strength is minimized by (1) providing carbon donors inside the treatment oven to reduce the amount of carbon converted directly from the fibers themselves, and (2) rapidly cooling the treated fibers as they leave the oven to reduce the tendency thereof to oxidize.

Another object of the invention is to exploit the carbon donor tendencies of fibers to make an alternative form of whisker-grown fiber having declivities in the fiber surfaces, thereby to roughen it, although at the expense of some loss of tensile strength.

Other objects and advantages of the invention will become apparent during the following description of specific working examples and various apparatus and product configurations shown in the accompanying drawings, wherein.

Figure 1:
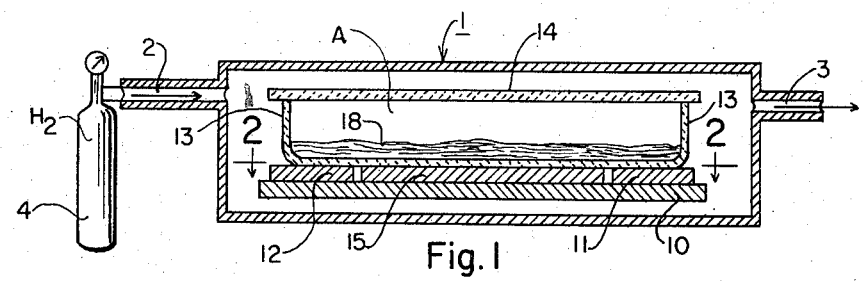
FIG. 1 is a view partly in cross-section of apparatus for carrying out the present process.
Figure 2:
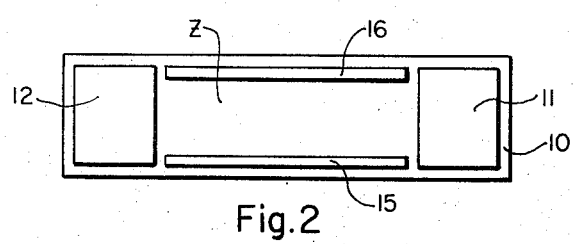
FIG. 2 is a partial view taken along line 2—2 of FIG. 1.

Referring now to the drawings, FIGS. 1 and 2 show typical apparatus for carrying out the present process by growing whiskers upon various fiber materials, especially those of graphitic form. The apparatus includes an oven 1, for instance, a 20 KW molybdenum-wound furnace, for establishing and maintaining the necessary high temperatures, generally in the range of 2,000° to 3,000,° F. The oven has an inlet duct 2 and an outlet duct 3 so that its interior can be continuously flushed with hydrogen gas moving to the right at a velocity of about 1 foot per second in the oven and supplied by a storage bottle 4. The hydrogen within the oven is maintained about at atmospheric pressure and has a controlled amount of water vapor entrained in it, as will be hereinafter discussed. The oven 1 is provided with suitable access doors (not shown).

Within the oven 1 is located a solid carbon or graphite sill 10 which supports other apparatus and insulates it against destructive thermal shock when the apparatus is first slid into the hot oven, for instance from ambient room temperature. The carbon sill 10 also supports two solid carbon spacers 11 and 12 upon which a ceramic boat 13 rests. The boat is a commercially purchased item composed of about 85 percent alumina, about 12 percent silicon dioxide and about 3 percent other oxides, and this composition is significant in some of the examples discussed below. The boat 13 contains aluminum shot, 3–5 mesh, and these shot particles melt and provide a puddle of liquid aluminum 18 in the boat. The boat 13 is closed by a ceramic cover 14, for instance Johns-Manville 3000 ceramic brick which is about 60 percent alumina, 30 percent silicon dioxide, and 10 percent other clays.

The openings between the sides of the boat 13 and the carbon sill 10 are closed by carbon strips 15 and 16 which, unlike the solid carbon supports 10, 11 and 12, are quite porous. These strips serve to exclude oxygen from the hollow zone Z between the bottom of the boat 13 and the top of the sill 10 so as to prevent oxidation of the materials within the zone Z when the apparatus is removed hot from the oven. When this apparatus is being used to treat carbon fibers, the porous strips 15 and 16 also serve as carbon donors for the purpose of reducing the amount of carbon which the present reactions convert directly from the fibers being treated, such carbon conversion representing weight loss of the fibers themselves and corresponding loss in fiber tensile strength, sometimes as much as 30 percent.

The material to be whisker grown is placed in the zone Z in some cases, or in the area A within the boat between the molten aluminum 18 and cover 14 in other cases, depending upon the chemical composition of the whiskers sought to be grown. The above apparatus produces whisker-growing atmospheres in the above mentioned zone Z and area A, these atmospheres being different and mutually competitive as will be discussed in connection with the various examples described below.

Since the whisker materials themselves do not vaporize, it is necessary to use gas transfer mechanisms for growing whiskers. The growing of silicon carbide whiskers, for example, requires the presence in the right proportions of silicon monoxide and carbon monoxide, these vapors being obtained by the following reactions involving: the molten aluminum contained within the boat, the silica and alumina which is part of the composition of the boat 13 and cover 14, the carbon of the strips 15 and 16, and the hydrogen and water vapor present in the flushing gas:

$$Al + SiO_2 \rightarrow AlO + SiO$$

$$H_2 + 2SiO_2 \rightarrow 2SiO + H_2O$$

$$H_2 + C + SiO \rightarrow SiC + H_2O$$

$$C + H_2O \rightarrow CO + H_2$$

$$CO + SiO + 2H_2 \rightarrow SiC + 2H_2O$$

Figure 3:
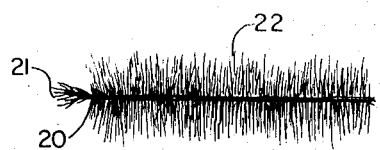
FIG. 3 is an enlarged view of a whisker grown yarn.

When these reactions take place in close proximity to carbon fibers, beta silicon carbide whiskers grow out normal to the fiber surfaces. These whiskers are monocrystalline in nature and their rate of growth and final shapes can be strongly influenced by controlling the vapor concentrations, i.e., the degrees of supersaturation thereof. If the concentration is low but within the whisker growing range, the silicon carbide is formed in the shape of long needlelike whiskers, for instance as shown in FIG. 3, where a yarn 20 of carbon fibers has whiskers 22 grown out 10 diameters, or more. The individual carbon fibrils 21 forming this yarn bundle 20 are about 10 microns in diameter, and the whiskers 22 are about 0.5 to 1 micron, the former being polycrystalline, and the latter being monocrystalline and exceptionally perfect in crystal structure.

Figure 4:
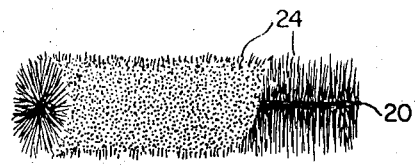
FIG. 4 is an enlarged view of a densely whisker grown yarn, resembling wool.

As the concentration of vapors is increased, whisker density greatly increases, for instance to produce much finer silicon carbide whiskers as small as .01 micron in diameter and resembling a dense wool as shown in FIG. 4. Here the yarn 20 of carbon fibrils has a growth of wool 24 wherein the population density is very high and the whiskers often fork or branch out so that they intertwine to a great extent. When greatly enlarged, the structure of FIG. 3 resembles a test-tube brush, whereas the structure of FIG. 4 looks more like a pipe cleaner.

Where the concentration of vapors is further increased well above the wool-growing level, the seeding and vapor precipitation becomes so great that silicon carbide powder is formed rather than whiskers, and therefore the concentration has exceeded the whisker growing range for the particular vapors selected.

When there is sufficient other carbon present during "Whiskerizing" of carbon fibers either as solid carbon, CO, or $CH_4$, the silicon carbide grows outwardly from the fiber surfaces, but when the carbon available to the process is low, the silicon monoxide reacts directly with the carbon of the fiber substrate, and forms sub-micron silicon carbide powder by direct conversion of carbon taken from the substrate itself, with the result that silicon carbide grows inwardly into the surface of the fibril tending to weaken its tensile strength, although it does form a silicon carbide coating on the fiber, which coating increases the ability of the fiber to bond to plastic matrix materials. The resulting loss of weight of the fiber was a major problem during early efforts to grow whiskers upon carbon fibrils without reducing their modulus.

Practical conditions for whisker growth are illustrated by reference to FIGS. 1 and 2 as follows: The ceramic boat 13 used in early experiments was 18 inches long, 5 inches wide and 2 inches deep. Its own composition was as set forth above, and its walls were 1/4 inch thick. The boat was filled with 2 pounds of pure aluminum shot and was placed upon a dense graphite sill 10 and dense graphite spacers 11 and 12. Within the oven 1, the temperature was raised to 2,600° F and the oven was flushed with hydrogen gas at approximately atmospheric pressure and containing 50 parts per million of moisture. The gas velocity was about 1 foot per second. After 2 hours, the sill and boat were withdrawn from the furnace, and examination thereof showed that directly beneath the boat and in the immediate vicinity thereof beta silicon carbide crystals were grown upon the sill, because the concentration of silicon monoxide vapor was high immediately adjacent to the boat. Most of the growth, however, was in the form of sub-micron powder which grew as a result of direct conversion of the carbon at the immediate surface of the sill where carbon atoms where plentiful and the concentration of SiO was high. However, at a distance somewhat more removed from the boat, the concentration of SiO was lower, and therefore the silicon carbide grew as whiskers instead of powder. Still further away from the sill, the SiO vapor concentration was reduced to the point where growth ceased. The above experiment took place in the absence of any fibers in the zone Z and in the absence of porous carbon strips 15 and 16.

Subsequently porous carbon members 15 and 16 were added in the form of sheets about 1/4 inch to 1/2 inch thick laid upon the carbon sill beneath the boat as shown in FIGS. 1 and 2. The experiment was re-run using the same parameters: reducing atmosphere, temperature, and time, and in this instance a much greater growth of silicon carbide crystals resulted because of the greatly increased carbon surface provided by the porous sheets 15 and 16 which then resulted in the production of adequate carbon monoxide. This time, the growth was in the form of whiskers rather than powder, the growth being especially thick upon the porous carbon sheets, but also distributed throughout the pores of the sheets. The degree of penetration of whisker growth is diffusion dependent, the growth penetrating about 1/4 inch of 50 percent porous carbon per hour at 2,600° F. It was also found that by changing the parameters to increase the temperature, or by increasing the porosity of the carbon, the pentration of the whisker growth within the porous carbon sheets was greatly accelerated. With the above as background, the following examples of whisker growing will be illustrative of the process and resulting products.

EXAMPLE I

Figure 5:
FIG. 5 is an enlarged view of a pile of whisker grown discrete particles.

Using the same parameters as set forth in the preceding several paragraphs, powdered carbon was piled within the zone Z between the solid carbon spacers 11 and 12 and the porous strips 15 and 16, and whiskers were then grown upon the powdered carbon for sufficient time to permit growth penetrating throughout the carbon pile. The type of growth which resulted is shown in FIG. 5. The individual carbon particles 30 were "Whiskerized" so that a dense intergrowth formed a complete whisker network around all of the carbon particles, these whiskers intertwining to form a novel light-weight porous structure which no longer exhibited the general characteristics of a loose powder but had a great deal of structural integrity. This resulting product was then transformed into a sponge of interlocked beta silicon carbide whiskers by heating the product to 1,600° F for a period of 4 to 6 hours in the presence of oxygen to burn off the uncoverted carbon particles and leave only the whiskers.

EXAMPLE II

Figure 6:
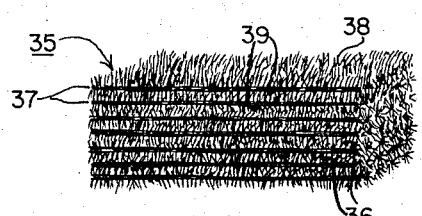
FIG. 6 is an enlarged view of a stack of overlaid fibers of yarn, whisker grown to interweave the stack into a unified mat or rod.

In this example, the zone Z bounded by the solid carbon spacers 11 and 12 and the porous carbon strips 15 and 16 was occupied by suitable support means strung with bundles of high modulus graphite fiber in the form of a yarn of the type shown in FIG. 3 composed of a large number of 10 microns fibrils, and the porous carbon strips 15 and 16 were brought into fairly close proximity thereto so as to act as carbon donors. Several such experiments were then run to produce silicon carbide whisker growth as shown in FIGS. 3 and 4, depending upon the concentration of vapors and the length of time the experiment was run. The general experiment was then re-run using mats of fibers or yarn stacked on top of each other as shown in FIG. 6 to form a three-dimensional rod which is approximately 1/2 inch × 1/2 inch × 14 inches, weighing about 20 grams. The particular fibers used were of the type made by Union Carbide under the trade name Thornel 25 or Thornel 40, or made by Hitco under the designation HCM 25, or made by the British Royal Air Force Establishment. The fibers were of carbon in highly crystallized graphite form having very smooth external surfaces which do not easily convert as carbon donors, and most of the carbon was therefore taken from the porous strips 15 and 16, which were brought close to the rod being treated. The stack of fibers forming the rod is generally referred to by the reference numeral 35 in FIG. 6, and comprises individual carbon fibers and bundles 37 with a dense growth of whisker 38 extending between them. The time required to grow the whiskers throughout the rod 35 depended somewhat upon the density with which the fibers were packed together when forming the rod but good whisker growth occurred within one hour. The whisker growth was about 1 to 5 percent in weight. After "Whiskerizing," the rod of fibers which were initially loosely associated had grown together to form an integral bundle which handled very much as though it was bound together. This type of rod when impregnated with a suitable matrix material provides a very high strength structure.

As possible modifications of the present example, the fibers can be laid together in random directions to form a kind of felt, or they can be crossed in alternate layers to form parallel unidirectional sheets alternating in the X direction and in the Y direction as the sheet is being stacked. The X and Y fibers may or may not be of identical materials, but in any event, after "Whiskerizing," the resulting composite no longer resembles loose layers of fibers, but is so well intergrown that it becomes a three dimensional bi-fiber composite of whiskers which not only link the various fibers together, but also grow to fill the void spaces between the various fibers and bundles, the voids 36, for instance, being larger than the voids 39, and all voids being secondarily reinforced by the growth of whiskers which, when the structure is impregnated by a plastic resin, will greatly reinforce the resin occupying the voids. In this way the resulting composite is strengthened in an additional manner which is quite beyond the degree of strengthening which could be provided by mere roughening of the original fibers and bundles to increase their ability to bond.

EXAMPLE III

In this example, the zone Z was occupied by one or more layers of woven cloth or tape sometimes overlaid in groups including as many as 10 layers. For this purpose, multiplie layers of woven graphite cloth, Hitco type C-cc-1A were placed under the ceramic boat, and this cloth was then "Whiskerized" under the same conditions as set forth above with the result that beta silicon carbide whiskers were grown extending in all directions from the carbon fibril surfaces. These whiskers grow to fill in all the interstitial voids within the weave as well as between the carbon cloth layers, and these whiskers taken with the cloth yarns formed an intergrown network of two different characters, namely the carbon fibers themselves, and the silicon carbide whiskers which grew so long and in such density that a new type of reinforcing product was formed, namely a three dimensional bi-fiber fabric.

EXAMPLE IV

In this example, alumina fibers were placed in the area A, within the boat and between the molten aluminum 18 and the ceramic cover 14, and in this area the same operational parameters results in a different process used to grow sapphire whiskers on the alumina surfaces. Within the aluminum boat the presence of water vapor and the presence of silicon monoxide provides a reaction which forms sapphire crystals $Al_2O_3$ growing upon the alumina fiber surfaces. The conditions for the growth of sapphire cyrstals are repugnant to the growth of silicon carbide crystals and vice versa. The silicon carbide cyrstals are grown in the presence of plentiful carbon donors in the form of porous strips 15 and 16 which contribute to the formation of carbon monoxide. However, although plentiful in zone Z, carbon monoxide is virtually absent from area A, FIG. 1, and therefore silicon carbide is not formed. Rather, sapphire crystals are formed on the fiber surfaces inside A. Sapphire crystals can also be grown on zirconia, titanium oxide, molybdenum, etc., these materials likewise being placed within the boat just above the molten aluminum in the absence of carbon donors. A further listing of compatible whisker materials and substrate materials will appear hereinafter in the specification.

EXAMPLE V

Figure 8:
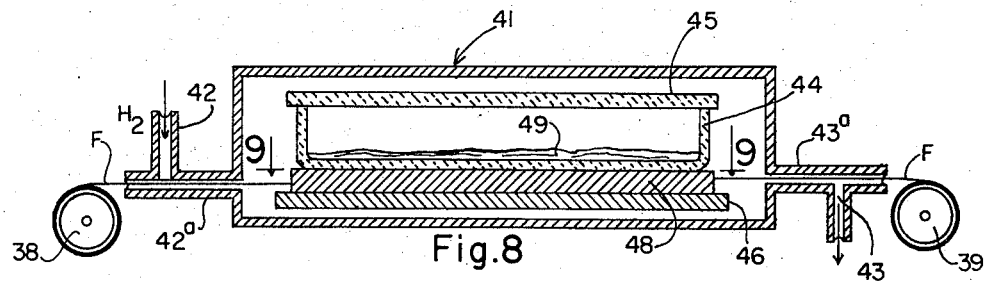
FIG. 8 is a view of a second form of apparatus suitable for "Whiskerizing" a continuous yarn or tape of material being passed through it.
Figure 9:
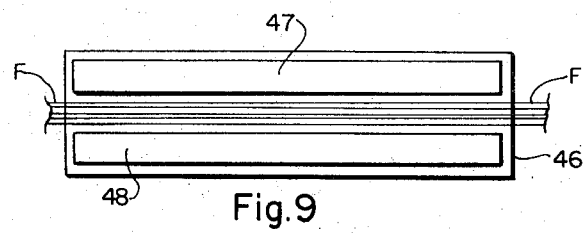
FIG. 9 is a partial sectional view taken along the line 9—9 of FIG. 8.

This example is given with reference to FIGS. 8 and 9, and shows the continuous processing of fibers fed through an oven 41 having suitable heating means (not shown) and having an inlet duct 42 and an exhaust duct 43 through which a hydrogen gas reducing atmosphere can be circulated. These members are connected to horizontal passageways 42a and 43a which are suitably shaped to receive a continuous run of fibers F which passes through the oven between driven spools 38 and 39. Inside the oven, a ceramic boat 44 is provided with a cover 45 and sits upon a sill 46, all of which parts are the same as those shown in FIGS. 1 and 2. The boat 44 is actually supported on two porous carbon bars 47 and 48 which not only support the boat 44 but also serve as carbon donors in the treatment of the fibers F as they pass through the oven. The boat contains molten aluminum 49, the entire system is raised to the temperature of 2,600° F by suitable means (not shown). The fibers F may comprise a single bundle, a plurality of parallel bundles, or a woven cloth or tape for purposes of the present illustration, there being no basic difference in the process. The passageways 42a and 43a can be provided with air locks at their extreme outer ends, although the air locks are really not necessary since the hydrogen gas will escape outwardly at these points and discourage the entry of atmospheric gases into the oven. The fibers F pass between the bottom of the boat 44 and the top of the sill 46 and between the porous carbon bars 47 and 48, which in the actual experiment were 1 inch × 1 inch × 20 inches. The carbon yarn was sufficiently "Whiskerized" for the purpose of adequately increasing its interlaminar shear capabilities after 10 minutes at 2,600° F inside the oven; while at 2,800° F less than 2 minutes was required. No doubt improved parameters can be used to reduce the transit time even further, for instance, by adding CO or $CH_4$ to the gas stream to increase the carbon donors. Moreover, a more efficient oven structure can be devised to process multiple strands or tapes simultaneously while passing them through paths of greater linear length. When multiple adjacent yarns were passed through the oven together in adjacent transverse mutual contact, they emerged as a unified ribbon because of intertwining of the grown whiskers. When woven tapes were passed through the oven in the above manner, continuous three dimensionally reinforced fiber laminates resulted having superior strengths in all directions when composited with matrix materials.

The above examples refer mostly to carbon fiber substrates, but there are many other practical examples showing different substrate materials and forms which are at the same time compatible with various whiskers grown according to techniques described in the following examples.

EXAMPLE VI

The apparatus shown in FIGS. 1 and 2 can be utilized to grow molybdenum silicide whiskers on molybdenum wire by supporting the latter adjacent to a carbon sill 10 and placing the boat 13 directly over the molybdenum wire in the zone Z. The oven is heated to 2,800° F and flushed with an $H_2$ gas stream as in the previous examples, the process being allowed to continue, for example for an hour. These reactions include:

$$Al + SiO_2 \rightarrow AlO + SiO$$

$$2SiO + Mo \rightarrow MoSi_2 + 2H_2O$$

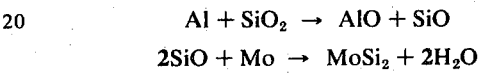

The resulting molybdenum disilicide whiskers are from .5 to 10 microns in diameter and up to a few millimeters in length.

EXAMPLE VII

Figure 7:
FIG. 7 is an enlarged view of woven fabric whisker grown subsequent to weaving.
Figure 10:
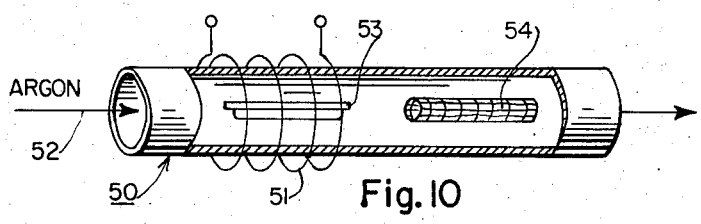
FIG. 10 is a view partially in section of a third form of apparatus for carrying out the present process.

This example refers to FIG. 10 and shows the growing of boron carbide whiskers on carbon filaments within a graphite-tube furnace 50 heated hotter near its left end by a resistance wire coil 51. Argon gas under a vacuum of 50 microns is flushed through the furnace in the direction of the arrow 52, and flows over a graphite boat 53 containing powdered boron carbide $B_4C$. The gas then flows over the carbon filaments 54 being treated, this example showing an open mesh cylinder of carbon filaments 54 which, when "Whiskerized," will resemble FIG. 7. These whiskers are grown by the pure vapor method wherein $B_4C$ powder is heated at reduced pressure to about 3,500° F, and its vapor is then condensed down-stream at a lower temperature of about 3,150° F upon the carbon mesh 54. The process takes from about 30 minutes to a few hours depending upon the desired whisker length.

EXAMPLE VIII

Figure 11:
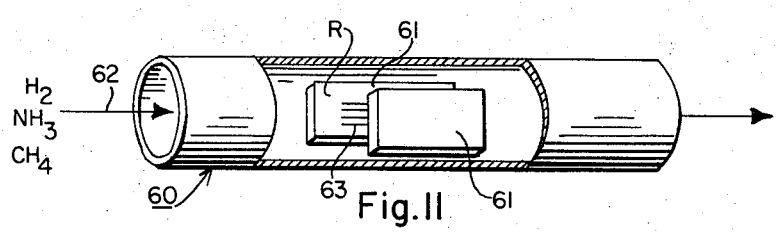
FIG. 11 is a view partially in section of a fourth form of apparatus for carrying out the present process.

This example demonstrates the growth of silicon nitride $Si_3N_4$ whiskers on silicon carbide or on graphite filaments, using apparatus illustrated in FIG. 11. A hydrogen atmosphere furnace 60 is used to heat porous high-silica brick 61 in the presence of other gases introduced into the furnace as shown schematically by the arrow 62. These other gases include hydrogen $H_2$, 100 parts; ammonia $NH_3$, 30 parts; and methane $CH_4$, one part. The process takes place preferably at a slowly rising temperature ranging from 2,550° to 2,650° F. Compatible fibers 63, such as carbon or silicon carbide, when placed in the whisker growth region R between the closely spaced bricks 61 will be "Whiskerized" according to the following reactions over a period of 1 to 6 hours.

$$3SiO_2 \text{ (Bricks)} + 3H_2 \rightarrow 3SiO + 3H_2O$$

$$4NH_3 \rightarrow 4N° + 6H_2$$

$$4N° + 3SiO + 3H_2 \rightarrow Si_3N_4 + 3H_2O$$

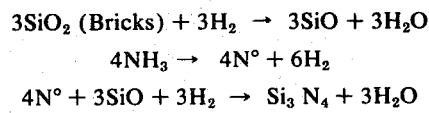

Final reaction:

$$3SiO_2 + 4NH_3 \rightarrow Si_3N_4 + 6H_2O$$

Actually Nacent Nitrogen may not be present but may form a complex with the methane which acts as a promoter. In this event a set of reactions may take place as follows:

$$3SiO_2 \text{ (Bricks)} + 3H_2 \rightarrow 3SiO + 3H_2O$$

$$4NH_3 + 4X\ CH_4 \rightarrow 4N(CH_4)_x + 6H_2$$

$$4N(CH_4)_x + 3SiO + 3H_2 \rightarrow Si_3N_4 + 4X\ CH_4 + 3H_2O$$

Final reaction:

$$3SiO_2 + 4NH_3 \rightarrow Si_3N_4 + 6H_2O$$

The small percentage of methane gas is added as a promoter of the decomposition of the ammonia gas to release the nitrogen which in turn reacts with the silicon monoxide to produce the $Si_3N_4$ whiskers. The furnace heating means is not shown in the present illustration.

EXAMPLE IX

Figure 12:
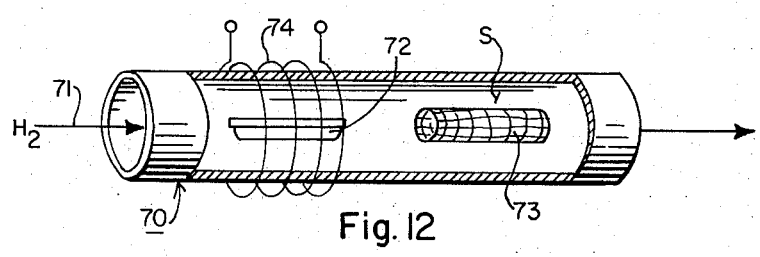
FIG. 12 is a view partially in section of a fifth form of apparatus for carrying out the present process.

This example shows the growing of metal whiskers upon grids or filaments which can be either metallic or ceramic. For instance copper whiskers can be grown on stainless steel screening by a process involving the reduction of a halide salt using the apparatus shown in FIG. 12.

$$2CuI + H_2 \rightarrow Cu + 2HI$$

This reaction takes place in a quartz tube 70, which is flushed with dry hydrogen gas as represented by the arrow 71, which gas flows over a boat 72 of heated copper iodide crystals to entrain vapor and pass it over the wires of the stainless steel screening 73. The vincinity of the boat 72 is heated, for instance by a resistance wire 74, to about 1,400° F, but the deposition of copper takes place in a cooler "Whiskerizing" section S of the apparatus, at about 1,000° F.

From the above examples, it can be seen that "Whiskerizing" can be accomplished either in systems where some of the elements are common, or none of the elements are common, to both the whiskers and the fibers. Examples of common-element systems include: carbon or graphite whiskers on carbon or graphite; silicon carbide whiskers on silicon (or on silicon dioxide, or on silicon carbide); molybdenum disilicide whiskers on molybdenum; tungsten disilicide whiskers on tungsten; boron carbide whiskers on carbon; boron whiskers on boron carbide or on boron nitride.

The other type of system includes entirely different elements in the whiskers and in the substrates. Examples thereof include: silicon carbide whiskers on boron; sapphire whiskers on zirconium oxide; silicon nitride whiskers on copper coppe whiskers on tungsten; and iron whiskers on molybdenum. The number of compatible combinations is almost limitless. It should be noted that the present reactions are not to be limited to an $H_2$ atmosphere. It is only necessary that the atmosphere be non-oxidizing. Moreover, care must be used to avoid incompatible combinations such as carbon whiskers on iron, carbon being soluble in iron; or sapphire whiskers on carbon, the necessary atmosphere oxidizing the carbon too quickly.

The present invention is not to be limited to the illustrative examples and drawings, for obviously the scope of the claims is much greater.

We claim:

1. An improved laminating structure comprising:
   a. a substrate including multiple laminating members placed close together to form a three dimensional structure having interstitial void spaces, said members having pollycrystalline laminating surfaces; and
   b. plural monocrystalline whiskers respectively integrally attached to crystals in the substrate surfaces and extending outwardly therefrom into said spaces.

2. In a laminating structure as set forth in claim 1, said substrate comprising fibers bundled together to form a matted structure, and said whiskers being much smaller in diameter than the fibers, and long enough to cross and intertwine within the spaces between the fibers and substantially hold the matted structure together.

3. In a laminating structure as set forth in claim 1, said substrate comprising woven cloth arranged to form a substantially three dimensional structure, and said whiskers being much smaller in diameter than the fibers, and long enough to cross and intertwine within the spaces between the cloth.

4. In a laminating structure as set forth in claim 1, said substrate comprising piled polycrystalline particles, and said whiskers being much smaller in diameter than the particles and long enough to cross and intertwine within the spaces between particles and substantially hold the particles together.

5. In a laminating structure as set forth in claim 1, said substrate comprising a yarn of associated individual fibers, the lengths of a substantial proportion of said whiskers being greater than the diameter of said yarn.

6. In a laminating structure as set forth in claim 5, the average spacings between said whiskers being much smaller than the average spacings between fibers of the yarn.

7. In a laminating structure as set forth in claim 1, said substrate comprising carbon fibrils, and said monocrystalline whiskers being long and widely spaced as compared with their monocrystalline diameters.

8. In a laminating structure as set forth in claim 7, said whiskers comprising silicon carbide crystals not substantially exceeding 1 micron in diameter.

9. In a laminating structure as set forth in claim 1, said whiskers comprising sapphire crystals, and said laminating structure comprising alumina polycrystalline fibers.

* * * * *